Aug. 12, 1947.  K. V. HART  2,425,470
WELDED JOINT
Filed Dec. 15, 1944

INVENTOR.
KENNETH V. HART
BY
Richey & Watts
ATTORNEYS

Patented Aug. 12, 1947

2,425,470

UNITED STATES PATENT OFFICE 2,425,470

WELDED JOINT

Kenneth V. Hart, Cleveland, Ohio

Application December 15, 1944, Serial No. 568,258

1 Claim. (Cl. 285—111)

The present invention relates generally to electrically welded joints between metal articles which are capable of being resistance welded and particularly to resistance surface filleted joints between the end surface of a tubular member and the side surface of another member, the members consisting of resistance weldable metal or metals.

In my U. S. Patent No. 2,091,982 issued on Sept. 7, 1937, I described a method and apparatus for making an "electric resistance surface weld joint" and in my Patent No. 2,183,563, issued December 19, 1939, I described and claimed that joint. In my copending application Ser. No. 568,259 filed December 15, 1944, now Patent No. 2,417,075, issued March 11, 1947, I have described and claimed new apparatus for carrying out the method of Patent No. 2,091,982 and for making not only the joints of that patent and of Patent No. 2,183,563 but also joints which are herein disclosed and claimed.

The joint of the present invention is an improvement of the joint described in my aforesaid patents and is characterized by possessing the advantageous features of those previously described joints and additional desirable features presently to be described.

In the drawings accompanying and forming a part of this specification,

Figure 2 is an enlarged sectional view taken on line 2—2 of Fig. 1a; and,

Figure 1:
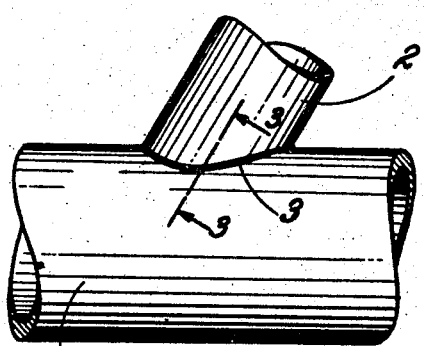
Figure 1 is a side elevational view of a joint of the present invention connecting the end of one tube to the side of another tube.
Figure 1A:
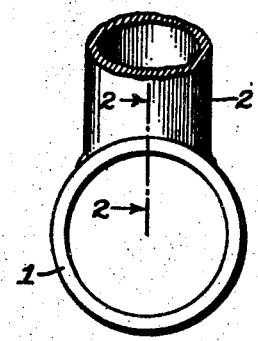
Figure 1a is an end elevational view of the joint of Fig. 1.

In Fig. 1 the outer, curved side surface of tube 1 is joined to the end surface of tube 2 by a filleted electric resistance surface weld 3. As will be noted from this figure and also Figs. 2 and 3, the weld metal extends beyond the outer surface of tube 2 and fills the angular space between tubes 1 and 2 where it has a curved or filleted outer surface 4. This filleted surface gives a finished appearance to the joint and makes finishing operations, such as polishing, painting and the like, easy to perform.

Figure 2:
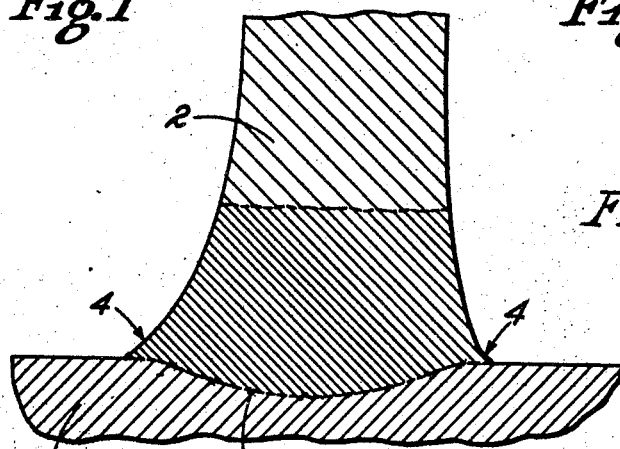
Figure 3:
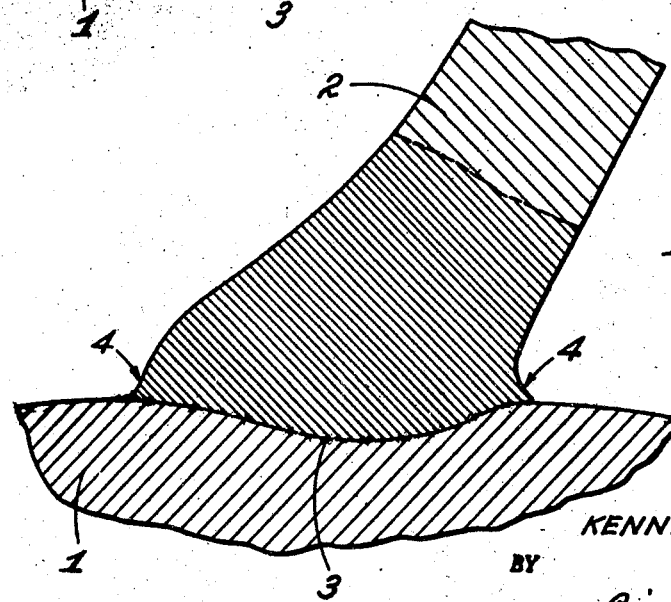
Figure 3 is an enlarged sectional view taken on line 3—3 of Fig. 1.

Figs. 2 and 3 show an important feature of this invention, viz.: that the depth of penetration of welding heat into the end of the tube 2 is less than the radial thickness of that tube. It will be understood that, since Fig. 3 which is taken on line 3—3 of Fig. 1, shows part of the side of tube 1, the sheet of drawing should be turned counter-clockwise about 45° when Fig. 3 is being viewed to place it in a more nearly true position. The wall of tube 2 is 16 gage or .062" while the depth of heat penetration in Fig. 2 ranges from about .05" to about .06". In Fig. 3 the true depth of heat penetration is about .06" as is indicated on the inner side of tube 2, the greater apparent depth along the outer side being due to the combined heating effect of the current on the initial narrow contact area of the tube end and of the thus heated metal which is forced out into the wedge shaped recess between the two tubes. The metal of tube 2 within the heated portion defined by the heat line and the tube end has been upset and somewhat thickened by the welding pressure.

The heat supplied during the welding operation altered the metallographic structure of the metal of tube 2 to a surprisingly slight extent. Even at points closely adjacent to the weld the metal of tube 2 was affected only to a slight extent as was indicated by a small amount of carbon precipitation at the grain boundaries. There was practically no noticeable enlargement of the grains of the tube. At points more and more remote from the weld the amount of carbon precipitation gradually decreased until it ceased at the heat line or end of heat penetration. The metallographic structure of the metal of tubes 1 and 2, even closely adjacent to the weld, is not altered in any practical sense of the word during welding and neither the weld metal nor tubes 1 and 2 is oxidized by the welding heat to a material extent.

Figs. 2 and 3 also show another important feature of welds embodying the present invention. The length of the weld metal, measured radially of tube 2, is thicker than the wall of that tube, preferably at least 50% thicker. The radial thickness of the wall of tube 2 of these figures is .062" while the radial length of the welds of Figs. 2 and 3 is .10" and .11" respectively.

Another important feature of welds embodying the present invention, as shown by Figs. 2 and 3, is that the end of tube 2 has penetrated into the side of tube 1 to a distance ranging from about 15% to about 25% of the wall thickness of tube 2 and the weld line between these members is concave in tube 1 and convex at the end of tube 2.

Welds embodying the three foregoing important features are considerably stronger than the body metal of tube 2 and serve to absorb stresses, shocks and loads transmitted to it by either of the welded members and to distribute those forces to the other welded member.

In making welds embodying the present invention the end of tube 2 is preferably shaped after the manner shown in my above mentioned patents to conform to the opposed tube or other member which is to be welded thereto. This shaping involves providing on the end of tube 2 a narrow, radially short or, substantially line, contact thruout the circumference of the tube with the opposed metal member and a beveled surface which forms with the opposed member an included small, acute angle.

The apparatus for and method of making welds of the present invention between members shaped as just described is set out in considerable detail in my copending application Ser. No. 568,259, filed December 15, 1944, now Patent No. 2,417,075, issued March 11, 1947. Briefly stated, that apparatus includes an electrode which can supply a heavy current for a very brief interval of time, such as that equivalent to the time of a half cycle or a few cycles of sixty-cycle alternating current, to the engaged portions of the two articles, thereby almost instantaneously generating very high heat in the radially short contact area which has great resistance and heating the metal behind that metal to a deformable, extrudable or forgeable condition. That apparatus also includes mechanism for advancing the said electrode under high pressure as the metal of the tube end softens. In this manner the highly heated weldable metal of the tube end is spread laterally between the surfaces of the tube end and the opposed member until it has a radial length at least fifty per cent greater than the thickness of the wall of the tube, and the tube end is caused to penetrate into the opposed member to the extent of from about 15% to about 25% of the wall thickness of the tube end with resultant formation of a concavo-convex weld line 3 which is concave in the opposed member and convex at the tube end.

It will be understood that joints of the present invention may be made not only between the end of a tube and the side of another tube but also between the end of a tube and the side of another member which may be a flat plate or other non-tubular member.

Having thus described my invention so that others skilled in the art may be able to understand and practice the same, I state that what I desire to secure by Letters Patent is defined in what is claimed.

What is claimed is:

A metal structure comprising a tubular metal member, an opposed metal member and a resistance surface weld uniting an end of said tubular member to a side of said opposed member, said weld having a radial thickness at least fifty per cent greater than the wall thickness of the tubular member, the end surface of said tubular member penetrating into said opposed member to between about 15% and about 25% of the wall thickness of the tubular member, said penetration being incident to pressure applied during the welding process the depth of heat penetration in the tubular member, as evidenced by carbon precipitation, being less than the wall thickness of the tubular member.

KENNETH V. HART.

REFERENCES CITED

The following references are of record in the file of this patent:

UNITED STATES PATENTS

| Number | Name | Date |
|---|---|---|
| 1,992,960 | Miller | Mar. 5, 1935 |
| 1,924,121 | Jasper | Aug. 29, 1933 |